(12) United States Patent
Kim et al.

(10) Patent No.: US 12,129,318 B2
(45) Date of Patent: Oct. 29, 2024

(54) METHOD FOR PREPARING VINYL CHLORIDE-BASED POLYMER

(71) Applicant: LG CHEM, LTD., Seoul (KR)

(72) Inventors: Kun Ji Kim, Daejeon (KR); Seong Yong Ahn, Daejeon (KR); Heung Kwon Bae, Daejeon (KR); Se Woong Lee, Daejeon (KR); Dae Woo Lee, Daejeon (KR); Hyun Kyou Ha, Daejeon (KR)

(73) Assignee: LG CHEM, LTD., Seoul (KR)

( * ) Notice: Subject to any disclaimer, the term of this patent is extended or adjusted under 35 U.S.C. 154(b) by 403 days.

(21) Appl. No.: 17/782,919

(22) PCT Filed: Sep. 14, 2021

(86) PCT No.: PCT/KR2021/012498
§ 371 (c)(1),
(2) Date: Jun. 6, 2022

(87) PCT Pub. No.: WO2022/065784
PCT Pub. Date: Mar. 31, 2022

(65) Prior Publication Data
US 2023/0022810 A1     Jan. 26, 2023

(30) Foreign Application Priority Data

Sep. 25, 2020   (KR) .......................... 10-2020-0124602
Sep. 13, 2021   (KR) .......................... 10-2021-0122024

(51) Int. Cl.
*C08F 6/00*          (2006.01)
*C08F 2/02*          (2006.01)
*C08F 114/06*      (2006.01)

(52) U.S. Cl.
CPC .............. *C08F 114/06* (2013.01); *C08F 2/02* (2013.01); *C08F 6/005* (2013.01)

(58) Field of Classification Search
None
See application file for complete search history.

(56) References Cited

U.S. PATENT DOCUMENTS

| | | |
|---|---|---|
| 4,086,414 A | 4/1978 | Hornbaker et al. |
| 4,184,924 A | 1/1980 | Hornbaker et al. |
| 4,229,568 A * | 10/1980 | Wada ............... C08F 14/06 528/500 |
| 5,804,039 A | 9/1998 | Kurazono et al. |
| 6,332,958 B1 | 12/2001 | Matsuda et al. |
| 2001/0018504 A1 | 8/2001 | Kobayashi et al. |
| 2006/0173146 A1 * | 8/2006 | Ooura ............... C08F 14/06 526/341 |
| 2015/0322188 A1 | 11/2015 | Bauer et al. |
| 2016/0038910 A1 | 2/2016 | Lee |
| 2017/0190808 A1 | 7/2017 | Heo et al. |

FOREIGN PATENT DOCUMENTS

| | | | |
|---|---|---|---|
| CN | 107474167 A * | 12/2017 | ............ C08F 114/06 |
| DE | 2500765 A1 | 7/1976 | |
| EP | 0756883 A2 | 2/1997 | |
| JP | H06-107723 A | 4/1994 | |
| JP | H10-338708 A | 12/1998 | |
| JP | 3029075 B2 | 4/2000 | |
| JP | 2000-212214 A | 8/2000 | |
| JP | 2001-270911 A | 10/2001 | |
| KR | 97-10799 A | 3/1997 | |
| KR | 10-2000-0062362 A | 10/2000 | |
| KR | 10-0449195 B1 | 12/2004 | |
| KR | 10-2015-0037044 A | 4/2015 | |
| KR | 10-2015-0037420 A | 4/2015 | |
| KR | 10-2015-0113129 A | 10/2015 | |
| KR | 10-2015-0137024 A | 12/2015 | |

OTHER PUBLICATIONS

Extended European Search Report issued Nov. 6, 2023 for European Patent Application No. 21872813.7.
International Search Report (with partial translation) and Written Opinion dated Dec. 24, 2021, for corresponding International Patent Application No. PCT/KR2021/012498.

* cited by examiner

*Primary Examiner* — Richard A. Huhn
(74) *Attorney, Agent, or Firm* — Morgan, Lewis & Bockius LLP

(57) ABSTRACT

The present invention relates to a method for preparing a vinyl chloride-based polymer, including: bulk polymerizing a vinyl chloride-based monomer in a polymerization reactor to prepare a vinyl chloride-based polymer; and adding water and vapor to the polymerization reactor, and heating to remove an unreacted vinyl chloride-based monomer, wherein an addition amount of the water is 0.500 to 5.000 parts by weight based on 100 parts by weight of the vinyl chloride-based polymer.

7 Claims, No Drawings

METHOD FOR PREPARING VINYL CHLORIDE-BASED POLYMER

CROSS-REFERENCE TO RELATED APPLICATIONS

The present application claims the benefit of priority based on Korean Patent Application Nos. 10-2020-0124602, filed on Sep. 25, 2020, and 10-2021-0122024, filed on Sep. 13, 2021, the entire contents of which are incorporated herein by reference.

TECHNICAL FIELD

The present invention relates to a method for preparing a vinyl chloride-based polymer, and particularly, to a method for preparing a vinyl chloride-based polymer, which may reduce an unreacted vinyl chloride-based monomer remaining in the vinyl chloride-based polymer.

BACKGROUND ART

Vinyl chloride-based polymers may be prepared by suspension polymerization, emulsion polymerization or bulk polymerization. Different from the suspension polymerization and the emulsion polymerization, the bulk polymerization does not use a heating medium such as water, and processes such as dehydration and drying after polymerization may be minimized, and thus, it has the advantages of low manufacturing price.

Meanwhile, in the case of the bulk polymerization, a recovering process of an unreacted vinyl chloride-based monomer from a polymerization reactor is performed after the bulk polymerization. However, the unreacted vinyl chloride-based monomer present in the vinyl chloride-based polymer is difficult to remove. In order to remove such unreacted vinyl chloride-based monomer, a process of heating while spraying vapor to the vinyl chloride-based polymer present in the polymerization reactor has been suggested, but there have been defects of deteriorating thermal stability of the vinyl chloride-based polymer due to heating. In addition, after the bulk polymerization, there has been suggested a method of removing an unreacted vinyl chloride-based monomer by using a separate removal device, but there were defects of markedly increasing the manufacturing price.

PRIOR ART DOCUMENTS

Patent Documents (Patent Document 1) KR 2015-0037420A
(Patent Document 2) KR 2015-0137024A

DISCLOSURE OF THE INVENTION

Technical Problem

The task to solve in the present invention is to provide a method for preparing a vinyl chloride-based polymer that may reduce an unreacted vinyl chloride-based monomer remaining in a vinyl chloride-based polymer, without using a separate device.

Technical Solution

In order to solve the above task, there is provided in the present invention, a method for preparing a vinyl chloride-based polymer, comprising: bulk polymerizing a vinyl chloride-based monomer in a polymerization reactor to prepare a vinyl chloride-based polymer; and adding water and vapor to the polymerization reactor, and heating to remove an unreacted vinyl chloride-based monomer, wherein an addition amount of the water is 0.500 to 5.000 parts by weight based on 100 parts by weight of the vinyl chloride-based polymer.

Advantageous Effects

According to the method for preparing a vinyl chloride-based polymer of the present invention, an unreacted vinyl chloride-based monomer present in a vinyl chloride-based polymer may be simply removed without a separate device.

According to the method for preparing a vinyl chloride-based polymer of the present invention, a vinyl chloride-based polymer with improved thermal stability may be prepared.

BEST MODE FOR CARRYING OUT THE INVENTION

Hereinafter, the present invention will be described in more detail to assist the understanding of the present invention.

It will be understood that words or terms used in the description and claims shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

DEFINITION OF TERMS

The term "vinyl chloride-based polymer" in the present invention may be a homopolymer prepared by polymerizing a vinyl chloride-based monomer alone; or a copolymer prepared by copolymerizing a vinyl chloride-based monomer and a comonomer which is copolymerizable with the vinyl chloride-based monomer. The vinyl chloride-based monomer may be vinyl chloride. The comonomer may be one or more selected from the group consisting of ethylene, propylene, vinyl acetate, vinyl propionate, acrylonitrile, methyl vinyl ether, ethyl vinyl ether, acrylic acid, acrylic anhydride, methacrylic acid, methacrylic anhydride, itaconic acid, itaconic anhydride, maleic acid and maleic anhydride.

The term "initiator" used in the present invention may mean a polymerization initiator. The initiator may be one or more selected from the group consisting of dicumyl peroxide, dipentyl peroxide, di(3,5,5-trismethylhexanoyl)peroxide, dilauroyl peroxide, diisopropyl peroxydicarbonate, di-sec-butylperoxydicarbonate, di(2-ethylhexyl)peroxy dicarbonate, t-butylperoxy neodecanoate, t-butylperoxy neoheptanoate, t-amyl peroxy neodecanoate, cumyl peroxyneodecanoate, cumyl peroxyneoheptanoate, 1,1,3,3-tetramethylbutyl peroxyneodecanoate, azobis-2,4-dimethylvaleronitrile, potassium persulfate and ammonium persulfate.

The term "water" used in the present invention may mean water in a liquid state, and the term "vapor" may mean water in a gas state.

The term "polymerization conversion ratio" used in the present invention may be computed by an equation below.

Polymerization conversion ratio (%)={(weight of vinyl chloride-based monomer added until completing polymerization)−(weight of unreacted vinyl chloride-based monomer at a point where measuring polymerization conversion ratio)}/(weight of vinyl chloride-based monomer added until completing polymerization)×100

Method for Preparing Vinyl Chloride-Based Polymer

The method for preparing a vinyl chloride-based polymer according to an embodiment of the present invention comprises: bulk polymerizing a vinyl chloride-based monomer in a polymerization reactor to prepare a vinyl chloride-based polymer; and adding water and vapor to the polymerization reactor, and heating to remove an unreacted vinyl chloride-based monomer, wherein an addition amount of the water is 0.500 to 5.000 parts by weight based on 100 parts by weight of the vinyl chloride-based polymer.

The vinyl chloride-based polymer according to an embodiment of the present invention is prepared by bulk polymerization, and generally, water or an organic solvent, which may be a heating medium, is not present during the bulk polymerization, and there are advantages of directly removing an unreacted monomer by heating in a vacuum state through steam in a polymerization reactor.

On the contrary, in a polymerization reactor undergone suspension polymerization, emulsion polymerization or solution polymerization, due to a heating medium including an organic solvent or water, essentially accompanied in a polymerization process in a polymerization reactor, a separate desolvation and removal device is necessary, to induce defects of markedly increasing the manufacturing price.

However, in the case of the vinyl chloride-based polymer prepared by the bulk polymerization, no heating medium is present, and there are advantages in that an unreacted monomer may be removed through a process like direct heating. However, the absence of the heating medium may become a factor inducing the thermal deformation of the polymer itself, and thermal stability may be deteriorated. In addition, it is difficult to secure the removal of an unreacted monomer and the thermal stability simultaneously, and there are limits of suitably targeting any one effect according to the use, but in the case of applying the preparation method according to an embodiment of the present invention, improving effects of both the removal of an unreacted vinyl chloride-based monomer and improving thermal stability could be achieved, and the above-described limits could be overcome.

Particularly, if water which is a liquid is added to a polymerization reactor in which a vinyl chloride-based polymer is present, water runs from the top to bottom by gravity, and water may be present between polymer particles and the bottom. In addition, if heated in that state, water may vaporize, and an unreacted vinyl chloride-based monomer remaining in the vinyl chloride-based polymer may be removed together, and thus, the unreacted vinyl chloride-based monomer present in the vinyl chloride-based polymer may be reduced by a simple method.

However, if only water is added to a polymerization reactor solely, excessive energy is required to vaporize water, and the manufacturing price may increase. If only vapor is added to a polymerization reactor solely, an unreacted vinyl chloride-based monomer remaining in a vinyl chloride-based polymer is not removed easily. In addition, in order to remove an unreacted vinyl chloride-based monomer through vapor and the inner temperature of the polymerization reactor, the inner temperature of the polymerization reactor is required to increase, and if the inner temperature of the polymerization reactor is increased, unstable double bonds may be formed in a vinyl chloride-based polymer chain, and the color properties of the vinyl chloride-based polymer may be deteriorated. In addition, if an organic solvent other than water is added to a polymerization reactor, fire and explosion hazards may arise due to synergistic effects of the vinyl chloride-based monomer and the organic solvent, undesirably.

Meanwhile, water may preferably be added at once to increase the heat transfer efficiency in the vinyl chloride-based polymer and the removing efficiency of the unreacted vinyl chloride-based monomer. In addition, if vapor is added to the vinyl chloride-based polymer at once or at installments, the removing efficiency of the unreacted vinyl chloride-based monomer may be degraded due to the reduction of the temperature, and the vapor is preferably added continuously.

Also, in order to increase the removing efficiency of an unreacted vinyl chloride-based monomer, after adding water, heating is preferably performed while spraying vapor.

Meanwhile, water may be added in 0.500 to 5.000 parts by weight, preferably, 1.000 to 4.000 parts by weight based on 100 parts by weight of the vinyl chloride-based polymer. The aforementioned range may be a range that may minimize remaining water to a suitable amount for removing an unreacted monomer, preventing the thermal deformation of the polymer thus prepared to provide excellent thermal stability, and minimizing the dysfunction of a heating medium. That is, through the removal of the vinyl chloride-based monomer remaining in the vinyl chloride-based polymer, the thermal stability of the vinyl chloride-based polymer may be improved, water remaining is the vinyl chloride-based polymer may become small, and time and energy consumed for the removal of water may be minimized. However, if water is added in a less amount than the above-described range, the color properties of the vinyl chloride-based polymer may be deteriorated. If water is added in a greater amount than the above-described range, water remaining in the vinyl chloride-based polymer may increase markedly, and time and energy consumed for the removal of water may be markedly increased.

Meanwhile, the heating may be performed at 60 to 80° C., preferably, 65 to 75° C. If the above-described conditions are satisfied, the thermal stability of the vinyl chloride-based polymer may be improved, while easily removing the unreacted vinyl chloride-based monomer remaining in the vinyl chloride-based polymer. In addition, water may be easily vaporized due to the synergistic effects of the vapor and the heating temperature, and the removing efficiency of the unreacted vinyl chloride-based monomer may be increased.

The heating may be performed under vacuum conditions. In order to maintain the vacuum conditions, vapor, an unreacted vinyl chloride-based monomer, or the like, present in the polymerization reactor is required to be sucked up to the outside. Accordingly, if the heating is performed under such vacuum conditions, the diffusion and removal of supplied vapor and unreacted vinyl chloride-based monomer may be performed more easily. Meanwhile, the inner pressure of the polymerization reactor may be −1 to −0.5 $kgf/cm^2$ during the heating under vacuum conditions.

The method for preparing a vinyl chloride-based polymer according to an embodiment of the present invention may include a step of drying a vinyl chloride-based polymer from which an unreacted vinyl chloride-based monomer has been removed, after removing the unreacted vinyl chloride-based monomer. If the drying step is performed, the amount of water remaining in the vinyl chloride-based polymer may be minimized, and the generation of defects due to water during transporting and processing of the vinyl chloride-based polymer may be prevented.

Meanwhile, the step of preparing the vinyl chloride-based polymer may be a step of preparing a vinyl chloride-based polymer by bulk polymerizing a vinyl chloride-based monomer in the absence of a particle nucleus, or a step of preparing a vinyl chloride-based polymer by bulk polymerizing a vinyl chloride-based monomer in the presence of a particle nucleus. Considering a preparation yield, the vinyl chloride-based polymer is preferably prepared in the presence of a particle nucleus.

The method for preparing a vinyl chloride-based polymer in the presence of a particle nucleus may include a step of bulk polymerizing a vinyl chloride-based monomer to prepare a particle nucleus, and a step of bulk polymerizing a vinyl chloride-based monomer to prepare a vinyl chloride-based polymer.

Since polymerization reaction in the step of preparing the particle nucleus is required to be performed not excessively, the polymerization reaction is preferably performed until a polymerization conversion ratio reached 10 to 15%.

The step of preparing the particle nucleus may be performed at 60 to 80° C., preferably, 65 to 75° C. In addition, the step of preparing the particle nucleus may be performed at 11 to 14 kgf/cm$^2$, preferably, 10 to 13 kgf/cm$^2$.

The step of preparing the vinyl chloride-based polymer may be performed at 50 to 70° C., preferably, 50 to 60° C. In addition, the step of preparing the vinyl chloride-based polymer may be performed at 7 to 9 kgf/cm$^2$, preferably, 7 to 8 kgf/cm$^2$. If the above-described conditions are satisfied, a vinyl chloride-based polymer with a desired size may be prepared by growing the particle nucleus.

Meanwhile, the bulk polymerization may be performed in the presence of an initiator.

Hereinafter, embodiments of the present invention will be explained in detail so that a person having ordinary knowledge in a technical field in which the present invention belongs to. However, the present invention may be accomplished in various different types and is not limited to the embodiments explained herein.

EXAMPLES AND COMPARATIVE EXAMPLES

Example 1

To a preliminary polymerization reactor (volume: 0.2 m$^3$) degassed into high vacuum, 140 kg of a vinyl chloride monomer and 85 g of t-butylperoxy neodecanoate as a reaction initiator were added in order, and while maintaining stirring, a pressure was raised to 12 kgf/cm$^2$ and bulk polymerization was performed for 12 minutes to prepare a particle nucleus mixture including a particle nucleus. In this case, a polymerization conversion ratio was 10%.

To a main polymerization reactor (volume: 0.5 m$^3$), 80 kg of a vinyl chloride monomer, the total amount of the particle nucleus mixture, and 200 g of 1,1,3,3-tetramethyl butylperoxyl neodecanoate as a reaction initiator were added in order, and while maintaining stirring and maintaining a pressure of 7.5 kgf/cm$^2$, bulk polymerization was performed for 200 minutes, and then, the polymerization was finished. In this case, a polymerization conversion ratio was 65%, and the vinyl chloride-based polymer thus obtained was 142.857 kg. Then, to the main polymerization reactor, 15 g of 4-hydroxy-2,2,6,6-tetramethyl-piperidine-1-oxyl, and 100 g of triethylene glycol-bis-3-(3-t-butyl-4-hydroxy-5-methylphenyl)propionate were added and stirred. After that, while maintaining the stirring of the main polymerization reactor, 0.80 kg of water was added at once, and while adding vapor under vacuum, heating was performed at 70° C. for 20 minutes to recover an unreacted vinyl chloride monomer, thereby preparing a vinyl chloride-based polymer.

Example 2 to Example 4

Vinyl chloride-based polymers were prepared by the same method as in Example 1 except for adding the water in amounts recorded in Table 1 below, in Example 1.

Example 5 and Example 6

Vinyl chloride-based polymers were prepared by the same method as in Example 1 except for adding the water in amounts recorded in Table 1 below and heating at a temperature recorded in Table 1 below, in Example 1.

Comparative Example 1

A vinyl chloride-based polymer was prepared by the same method as in Example 1 except for not adding water, in Example 1.

Comparative Example 2 and Comparative Example 3

Vinyl chloride-based polymers were prepared by the same method as in Example 1 except for adding the water in amounts recorded in Table 2 below, in Example 1.

Comparative Example 4

A vinyl chloride-based polymer was prepared by the same method as in Example 1 except for not adding water and heating to 90° C., in Example 1.

Experimental Example 1: Color Evaluation

To a transparent sample bag, 30 g of each of the vinyl chloride-based polymers of the Examples and Comparative Examples was put, and the surface of the sample bag at a position to be measured was flattened without wrinkle. The whiteness and a value of the vinyl chloride-based polymer were measured using a colorimeter (NR-3000 of Nippon Denshoku Kogyo Co.), and the results are shown in Table 1 and Table 2 below. Here, the higher whiteness value means better color quality. In addition, the increase of the a value means the increase of redness, and the decrease of the a value means better color quality.

Experimental Example 2: Measurement of Residual Vinyl Chloride Monomer

Based on a measurement method of ISO 6401 on a residual vinyl chloride monomer, the weight (ppm) of a residual vinyl chloride monomer was measured by gas chromatography (GC) of Agilent Co., and the results are shown in Table 1 and Table 2 below.

Experimental Example 3: Measurement of Residual Moisture 5 g of a vinyl chloride-based polymer was put in a moisture meter MA37 of Sartorius Co., the weight (wt %) of remaining moisture was measured at 80° C., and the results are written in Table 1 and Table 2 below.

TABLE 1

| Division | | Example 1 | Example 2 | Example 3 | Example 4 | Example 5 | Example 6 |
|---|---|---|---|---|---|---|---|
| Whether water is added | | ○ | ○ | ○ | ○ | ○ | ○ |
| Water addition amount | Kg | 0.80 | 2.50 | 4.50 | 6.50 | 4.50 | 4.50 |
| | Parts by weight | 0.560 | 1.750 | 3.150 | 4.550 | 3.150 | 3.150 |
| Heating temperature (° C.) | | 70 | 70 | 70 | 70 | 60 | 80 |
| Whiteness | | 89 | 90 | 90 | 90 | 92 | 89 |
| a value | | 0.6 | 0.5 | 0.5 | 0.4 | 0.3 | 0.8 |
| Residual vinyl chloride monomer (ppm) | | 15 | 13 | 18 | 25 | 29 | 13 |
| Residual moisture (wt %) | | 0.12 | 0.14 | 0.16 | 0.18 | 0.19 | 0.16 |

TABLE 2

| Division | | Comparative Example 1 | Comparative Example 2 | Comparative Example 3 | Comparative Example 4 |
|---|---|---|---|---|---|
| Whether water is added | | x | ○ | ○ | x |
| Water addition amount | Kg | 0.00 | 0.71 | 7.20 | 0.00 |
| | Parts by weight | 0.000 | 0.497 | 5.040 | 0.000 |
| Heating temperature (° C.) | | 70 | 70 | 70 | 90 |
| a value | | 1.2 | 1.3 | 0.3 | 1.8 |
| Whiteness | | 88 | 88 | 92 | 84 |
| Residual vinyl chloride monomer (ppm) | | 50 | 18 | 26 | 20 |
| Residual moisture (wt %) | | 0.12 | 0.12 | 0.80 | 0.07 |

Referring to Table 1 and Table 2, the vinyl chloride-based polymers of Example 1 to Example 4, in which water addition amount was diversified, color properties tended to be excellent with the increase of the addition amount of water. However, if the addition amount of water was a certain level or higher, the weight of a remaining vinyl chloride-based monomer tended to increase. In addition, referring to the vinyl chloride-based polymers of Example 3, Example 5 and Example 6, in which the heating temperature was diversified, color properties were excellent with the reduction of the heating temperature, but the weights of the residual vinyl chloride-based monomer and remaining moisture tended to increase. Meanwhile, the vinyl chloride-based polymers of Comparative Example 1 in which water was not added and Comparative Example 2 in which a small amount of water was added, showed degraded color properties and excessive amount of remaining vinyl chloride-based monomer in contrast to the Examples.

In addition, in the vinyl chloride-based polymer of Comparative Example 4 in which an excessive amount of water was added, it could be found that the weight of remaining moisture increased, excessive time and energy were consumed for removing the moisture, and preparation efficiency was markedly degraded.

In addition, in the vinyl chloride-based polymer of Comparative Example 4 in which water was not added, and the heating temperature was raised, a small amount of the vinyl chloride-based monomer remained, but color properties were markedly degraded.

The invention claimed is:

1. A method for preparing a vinyl chloride-based polymer, the method comprising:
    bulk polymerizing a vinyl chloride-based monomer in a polymerization reactor to prepare the vinyl chloride-based polymer; and
    adding water and vapor to the polymerization reactor, and heating to remove an unreacted vinyl chloride-based monomer,
    wherein an addition amount of the water is 0.500 to 5.000 parts by weight based on 100 parts by weight of the vinyl chloride-based polymer.

2. The method for preparing a vinyl chloride-based polymer according to claim 1, wherein the addition amount of the water is 1.000 to 4.000 parts by weight based on 100 parts by weight of the vinyl chloride-based polymer.

3. The method for preparing a vinyl chloride-based polymer according to claim 1, wherein the water is added at once.

4. The method for preparing a vinyl chloride-based polymer according to claim 1, wherein the vapor is continuously added.

5. The method for preparing a vinyl chloride-based polymer according to claim 1, wherein the heating is performed at 60 to 80° C.

6. The method for preparing a vinyl chloride-based polymer according to claim 1, wherein the heating is performed under vacuum.

7. The method for preparing a vinyl chloride-based polymer according to claim 1, further comprising drying the vinyl chloride-based polymer from which the unreacted vinyl chloride-based monomer has been removed, after removing the unreacted vinyl chloride-based monomer.

* * * * *